United States Patent
Herbeck et al.

(10) Patent No.: US 9,395,747 B1
(45) Date of Patent: Jul. 19, 2016

(54) METHOD FOR CALIBRATING A CLOCK SIGNAL GENERATOR IN A REDUCED POWER STATE

(71) Applicant: Apple Inc., Cupertino, CA (US)

(72) Inventors: Gilbert H. Herbeck, Livemore, CA (US); Gregoire J. Le Grand de Mercey, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/592,146

(22) Filed: Jan. 8, 2015

(51) Int. Cl.
*H03L 7/00* (2006.01)
*G06F 1/12* (2006.01)

(52) U.S. Cl.
CPC ........................................ *G06F 1/12* (2013.01)

(58) Field of Classification Search
USPC ......... 327/105, 123, 165, 166, 178, 291–299, 327/374; 326/93–98; 716/6; 331/1 A, 331/15–17; 375/373–376
See application file for complete search history.

(56) References Cited

U.S. PATENT DOCUMENTS

| | | | | |
|---|---|---|---|---|
| 5,982,238 A | * | 11/1999 | Soderquist | ................ G06F 1/10 327/149 |
| 6,204,694 B1 | * | 3/2001 | Sunter | ....................... G06F 1/08 326/93 |
| 6,946,920 B1 | * | 9/2005 | Williams | .................. H03L 7/00 327/159 |
| 7,702,371 B2 | | 4/2010 | Edwards et al. | |
| 8,170,165 B2 | | 5/2012 | Arviv et al. | |
| 8,188,782 B1 | * | 5/2012 | Lai | ............................ G06F 1/12 327/295 |
| 8,238,508 B2 | * | 8/2012 | Pignol | .................... H03L 7/083 327/152 |
| 8,560,875 B2 | | 10/2013 | Shen | |
| 8,612,794 B2 | | 12/2013 | Kojima | |
| 8,810,290 B1 | * | 8/2014 | Cloutier | ................... H03L 7/06 327/147 |

\* cited by examiner

*Primary Examiner* — Brandon S Cole
(74) *Attorney, Agent, or Firm* — Meyertons, Hood, Kivlin, Kowert & Goetzel, P.C.

(57) ABSTRACT

Various embodiments of a clock generator are disclosed. An example system may include a functional unit, and a clock generation unit configured to adjust a frequency of an output clock signal responsive to an assertion of an enable signal from the functional unit. The clock generation unit may also be configured to halt the output clock signal responsive to a de-assertion of the enable signal by the functional unit and to restart the output clock signal responsive to a determination that a first predetermined amount of time has elapsed since the output clock signal was halted. The clock generation unit may be further configured to adjust the frequency of the output clock signal responsive to restarting the output clock signal, and to halt the output clock signal responsive to a determination that the frequency of the output clock signal is within a predetermined frequency range that includes the target frequency.

20 Claims, 7 Drawing Sheets

METHOD FOR CALIBRATING A CLOCK SIGNAL GENERATOR IN A REDUCED POWER STATE

BACKGROUND

1. Technical Field

Embodiments described herein are related to the field of integrated circuit implementation, and more particularly to the implementation of clock signal generators.

2. Description of the Related Art

Computing systems may include one or more systems-on-a-chip (SoCs), which may integrate a number of different functions, such as, application execution, graphics processing and audio processing, onto a single integrated circuit. With numerous functions included in a single integrated circuit, chip count may be kept low in mobile computing systems, such as tablets, for example, which may result in reduced assembly costs, and a smaller form factor for such mobile computing systems.

SoC designs may include one or more clock signal generators, which are configured to output a clock signal at a target frequency. Some clock signal generators may adjust the clock signal at a periodic interval to compensate for changes in operating conditions such as a voltage supply level or an operating temperature. These adjustments may occur while the clock generator is actively generating the clock signal. In some embodiments, however, the clock signal generator may be disabled or otherwise placed in a reduced power state in which adjustments do not occur, during which time, changes to operating conditions may occur. As a result, when the clock signal generator is re-enabled, the clock signal may have a frequency different than the target frequency and may require time to recalibrate before circuitry in the SoC can use the clock signal. This delay for using the clock signal may result in reduced performance and increased power consumption.

SUMMARY OF THE EMBODIMENTS

Various embodiments of a clock generation unit are disclosed. Broadly speaking, a system, an apparatus, and a method are contemplated in which the system includes a functional unit, and a clock generation unit configured to adjust a frequency of an output clock signal in response to an assertion of an enable signal from the functional unit. The clock generation unit may also be configured to halt the output clock signal in response to a de-assertion of the enable signal by the functional unit and to restart the output clock signal in response to a determination that a first predetermined amount of time has elapsed since the output clock signal was halted. The clock generation unit may be further configured to adjust the frequency of the output clock signal in response to restarting the output clock signal, and to halt the output clock signal in response to a determination that the frequency of the output clock signal is within a predetermined frequency range that includes the target frequency.

In a further embodiment, to adjust the frequency of the output clock signal, the clock generation unit may be further configured to determine a difference between the frequency of the output clock signal and the target frequency. In a still further embodiment, the clock generation unit may be further configured to adjust the first predetermined amount of time dependent upon a most recent value of the difference between the frequency of the output clock signal and the target frequency.

In another embodiment, the clock generation unit may be further configured to determine the difference between the frequency of the output clock signal and the target frequency in a second predetermined amount of time. In one embodiment, the clock generation unit may be further configured to adjust the second predetermined amount of time dependent upon a most recent value of the difference between the frequency of the output clock signal and the target frequency.

In one embodiment, the functional unit may be further configured to de-assert the enable signal responsive to entering an inactive mode and wherein the clock generation unit is further configured to restart the output clock signal while the functional unit is in the inactive mode. In another embodiment, the first predetermined amount of time may be initially determined during a test procedure.

BRIEF DESCRIPTION OF THE DRAWINGS

The following detailed description makes reference to the accompanying drawings, which are now briefly described.

Figure 1:
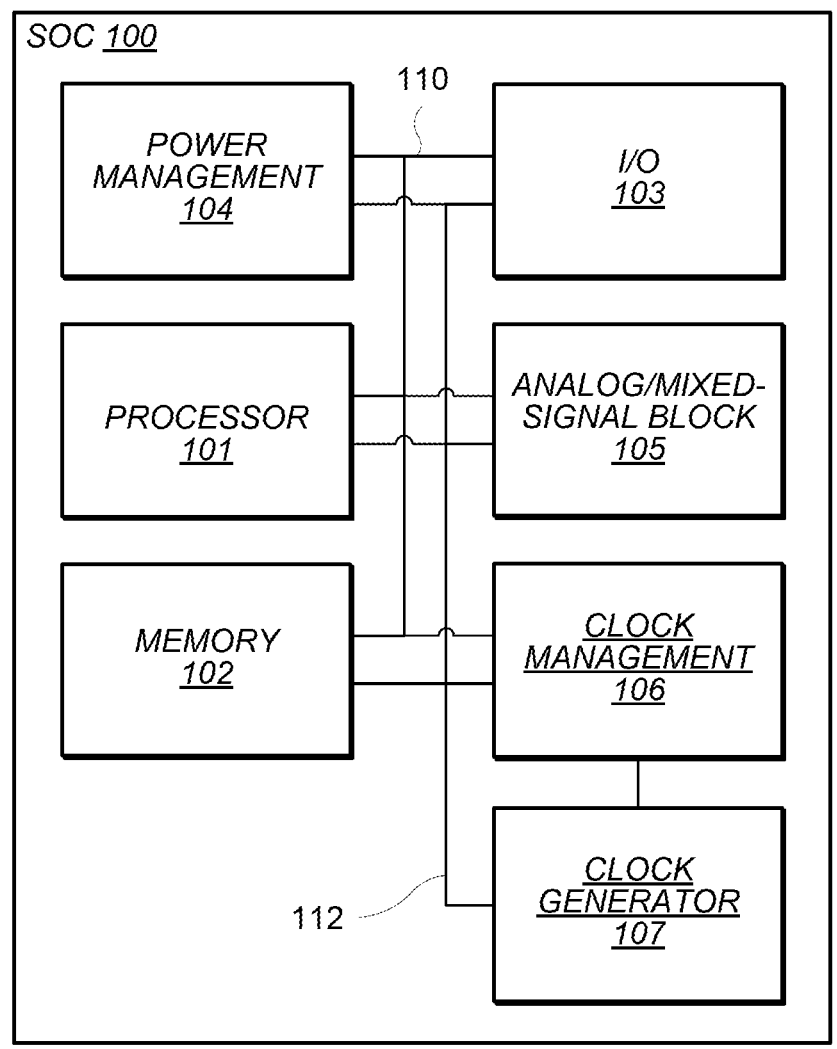
FIG. 1 illustrates an embodiment of a system-on-a-chip (SoC).

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component. More generally, the recitation of any element is expressly intended not to invoke 35 U.S.C. §112, paragraph (f) interpretation for that element unless the language "means for" or "step for" is specifically recited.

DETAILED DESCRIPTION OF EMBODIMENTS

A system on a chip (SoC) may include one or more functional blocks, such as, e.g., a processor and one or more memories, which may integrate the function of a computing system onto a single integrated circuit. SoC designs may include one or more clock generation units, configured to output a clock signal at a target frequency. Various clock generation units are known and contemplated, such as phase-locked loops (PLLs), delay-locked loops (DLLs), and frequency-locked loops (FLLs), for example. While operating, these closed-loop clock generation units may adjust the clock signal continuously or at periodic intervals to compensate for changes in operating conditions such as a voltage supply level or an operating temperature. When a frequency of a clock signal produced by a clock generation unit is within a predetermined range of the target frequency, the clock signal may be referred to as "locked."

The clock generation units may, in some embodiments, be disabled or placed in a reduced power state when the clock signal is not needed. During this inactive time, changes to operating conditions may occur, and, as a result, when the clock signal generator is re-enabled, the clock signal may have "lost lock," i.e., the clock signal may have a frequency outside of the predetermined frequency range from the target frequency. This difference between the target frequency and the actual frequency is commonly referred to as "frequency drift." The clock generation unit may require time to recalibrate (or "reacquire lock") before circuitry in the SoC can use the clock signal. The delay before the clock signal is ready for use by the SoC may result in reduced performance and increased power consumption.

The embodiments illustrated in the drawings and described below may reduce the delay time for a clock signal to recalibrate upon being re-enabled to compensate for temperature and/or voltage drifts. These embodiments may provide techniques that may allow for a clock signal to be adjusted while various functional blocks of the SoC are in reduced power states, without increasing overall power consumption.

Some terms commonly used in reference to SoC designs are used in this disclosure. For the sake of clarity, the intended definitions of some of these terms, unless stated otherwise, are as follows.

A Metal-Oxide-Semiconductor Field-Effect Transistor (MOSFET) describes a type of transistor that may be used in modern digital logic designs. MOSFETs are designed as one of two basic types, n-channel and p-channel. Complementary MOSFET (CMOS) describes a circuit designed with a mix of n-channel and p-channel MOSFETs. In CMOS designs, n-channel and p-channel MOSFETs may be arranged such that a high level on the gate of a MOSFET turns an n-channel transistor on, i.e., opens a conductive path, and turns a p-channel MOSFET off, i.e., closes a conductive path. Conversely, a low level on the gate of a MOSFET turns a p-channel on and an n-channel off. While CMOS logic is used in the examples described herein, it is noted that any suitable logic process may be used for the circuits described in embodiments described herein.

It is noted that "logic 1", "logic high", "high state", or "high" refers to a voltage sufficiently large to turn on a n-channel MOSFET and turn off a p-channel MOSFET, while "logic 0", "logic low", "low state", or "low" refers to a voltage that is sufficiently small enough to do the opposite. In other embodiments, different technology may result in different voltage levels for "low" and "high."

System-on-a-Chip Overview

A block diagram of an embodiment of an SoC is illustrated in FIG. 1. In the illustrated embodiment, the SoC 100 includes a processor 101 coupled to memory block 102, I/O block 103, power management unit 104, analog/mixed-signal block 105, clock management unit 106, all coupled through bus 110. Additionally, clock generator 107 may be coupled to clock management unit 106 and provide a clock signal 112 to the functional blocks in SoC 100. In various embodiments, SoC 100 may be configured for use in a mobile computing application such as, e.g., a tablet computer, smartphone or wearable device.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include multiple CPU cores and may include one or more register files and memories.

In various embodiments, processor 101 may implement any suitable instruction set architecture (ISA), such as, e.g., PowerPC™, or x86 ISAs, or combination thereof. Processor 101 may include one or more bus transceiver units that allow processor 101 to communication to other functional blocks via bus 110, such as, memory block 102, for example.

Memory block 102 may include any suitable type of memory such as, for example, a Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), Resistive Random Access Memory (RRAM or ReRAM), or a Magnetoresistive Random Access Memory (MRAM), for example. Some embodiments may include a single memory, such as memory block 102 and other embodiments may include more than two memory blocks (not shown). In some embodiments, memory block 102 may be configured to store program instructions that may be executed by processor 101. Memory block 102 may, in other embodiments, be configured to store data to be processed, such as graphics data, for example. Memory block 102, may, in some embodiments, include a memory controller for interfacing to memory external to SoC 100, such as, for example, one or more DRAM chips.

I/O block 103 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. I/O block 103 may include general-purpose input/output pins (I/O pins). In some embodiments, I/O block 103 may be configured to implement a version of Universal Serial Bus (USB) protocol, IEEE 1394 (Firewire®) protocol, or, and may allow for program code and/or program instructions to be transferred from a peripheral storage device for execution by processor 101. In one embodiment, I/O block 103 may be configured to perform the data processing necessary to implement an Ethernet (IEEE 802.3) networking standard.

Power management unit 104 may be configured to manage power delivery to some or all of the functional blocks included in SoC 100. Power management unit 104 may comprise sub-blocks for managing multiple power supplies for various functional blocks. In various embodiments, the power supplies may be located in analog/mixed-signal block 105, in power management unit 104, in other blocks within SoC 100, or come from external to SoC 100, coupled through power supply pins. Power management unit 104 may include one or more voltage regulators to adjust outputs of the power supplies to various voltage levels as required by functional blocks in SoC 100, such as for reduced power modes, for example.

Analog/mixed-signal block 105 may include a variety of circuits including, for example, a crystal oscillator, an internal oscillator, a phase-locked loop (PLL), delay-locked loop (DLL), or frequency-locked loop (FLL). One or more analog-to-digital converters (ADCs) or digital-to-analog converters (DACs) may also be included in analog/mixed signal block 105. Analog/mixed-signal block 105 may also include, in some embodiments, radio frequency (RF) circuits that may be configured for operation with cellular telephone networks. Analog/mixed-signal block 105 may include one or more voltage regulators to supply one or more voltages to various functional blocks and circuits within those blocks.

Clock management unit 106 may be configured to enable, configure and manage outputs of one or more clock sources. In various embodiments, the clock sources may be located in analog/mixed-signal block 105, in clock management unit 106, in other blocks with SoC 100, or come from external to SoC 100, coupled through one or more I/O pins. In some embodiments, clock management 106 may be capable of dividing a selected clock source before it is distributed throughout SoC 100. Clock management unit 106 may include registers for selecting an output frequency of a PLL, FLL, DLL, or other type of adjustable clock source.

Clock generator 107 may be a sub-module of analog/mixed signal block 105 or clock management unit 106. In other embodiments, clock generator 107 may be a separate module within SoC 100. One or more clock sources may be included in clock generator 107. In some embodiments, clock generator 107 may include PLLs, FLLs, DLLs, internal oscillators, oscillator circuits for external crystals, etc. One or more clock signal outputs 112 may provide clock signals to various functional blocks of SoC 100.

System bus 110 may be configured as one or more buses to couple processor 101 to the other functional blocks within the SoC 100 such as, e.g., memory block 102, and I/O block 103. In some embodiments, system bus 110 may include interfaces coupled to one or more of the functional blocks that allow a particular functional block to communicate through the bus. In some embodiments, system bus 110 may allow movement of data and transactions (i.e., requests and responses) between functional blocks without intervention from processor 101. For example, data received through the I/O block 103 may be stored directly to memory block 102.

It is noted that the SoC illustrated in FIG. 1 is merely an example. In other embodiments, different functional blocks and different configurations of functions blocks may be possible dependent upon the specific application for which the SoC is intended.

Figure 2:
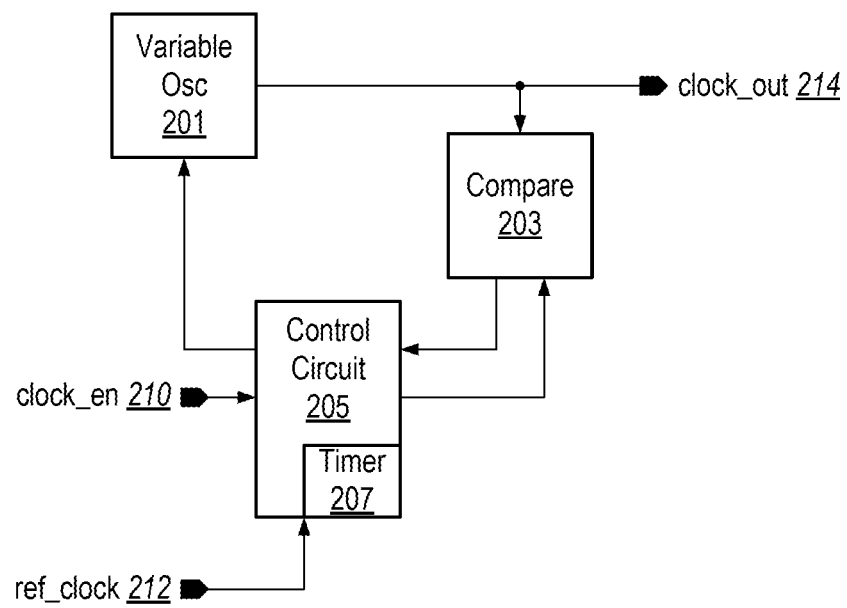
FIG. 2 illustrates a block diagram of a clock generation unit.

Turning to FIG. 2, an embodiment of a block diagram of a Clock Generation Unit (CGU) is illustrated. CGU 200 may represent a component or sub-component within an SoC, such as SoC 100, for example, and may correspond, in some embodiments, to a component of clock generator 107 in FIG. 1. CGU 200 may include variable oscillator (Variable Osc) 201 coupled to comparison circuit (Compare) 203, and control circuit 205. Control circuit 205 may include timing unit (timer) 207. CGU 200 may receive clock enable signal (clock_en) 210 and reference clock signal (ref_clock) 212, and may generate clock output (clock_out) 214.

CGU 200 may correspond to any of an FFL, PLL, DLL or other type of closed loop clock generation circuit. CGU 200 may generate a clock output for use by one or more functional blocks of SoC 100. In some embodiments, CGU 200 may be capable of generating a clock signal with one of multiple selectable target frequencies. While, in other embodiments, CGU may be configured to generate a clock signal at a single target frequency. In many embodiments, CGU 200 may be configured to generate clock_out 214 at a frequency that is an integer multiple of the frequency of ref_clock 212. In other embodiments, however, a fractional, i.e., non-integer, multiple of ref_clock 212 may be used to set the frequency of clock_out 214, including fractional multiples less than one, resulting in a frequency of clock_out 214 that is less than the frequency of ref_clock 212.

Variable oscillator 201 may output clock_out 214 with a frequency dependent on a comparison of the frequency of clock_out 214 and ref_clock 212 within comparison circuit 203. Depending on the type of CGU 200, comparison circuit 203 may compare a phase shift between edges of clock_out 214 and ref_clock 212 (PLL), a delay between edges of clock_out 214 and ref_clock 212 (DLL), or a frequency difference between clock_out 214 and ref_clock 212 (FLL). As an example, comparison circuit 203 may compare this to ref_clock 212, which may have a frequency of 24 MHz. In a PLL embodiment, comparison circuit 203 may divide clock_out 214 by an integer, such as eight, and then compare a phase alignment of rising and/or falling edges of the divided clock_out 214 to ref_clock 212, generating a voltage level depending on the magnitude of the difference. For example, if the phase of clock_out 214 is ahead of the phase of ref_clock 212, then a positive voltage level may be generated. If the phase of clock_out 214 is behind that of ref_clock 212, then a negative voltage may be generated. If the two signals are aligned, then the generated voltage level may be near zero volts, i.e., the PLL may be locked. In this example, since clock_out 214 was divided by eight before comparing to ref_clock 212, the resulting clock_out frequency would be 8×24 MHz, or 192 MHz.

In an FLL embodiment, comparison circuit 203 may count a number of cycles of clock_out 214 that occur during one or more cycles of ref_clock 212. Reusing the values from the PLL embodiment, if ref_clock 212 again has a frequency of 24 MHz and the target frequency is 192 MHz, then comparison circuit 203 may expect to count eight cycles of clock_out 214 in one period of ref_clock 212 (or 16 cycles of clock_out 214 in two periods of ref_clock 212). If comparison circuit 203 counts more than eight cycles of clock_out 214, then the number of extra cycles may be sent to control circuit 205. Conversely, if comparison circuit 203 counts less than eight cycles of clock_out 214, the number of cycles lacking may be sent to control circuit 205 as a negative number. The FLL may be considered locked if the difference between the expected cycle count and the actual cycle count is less than a threshold value.

Control circuit 205 may generate a correction value based on the results of the comparison received from comparison circuit 203. In some embodiments, the correction value may be sent directly to variable oscillator 201. For example, in the PLL embodiment, variable oscillator 201 may correspond to a voltage-controlled oscillator (VCO) and the voltage value received from comparison circuit 203 may decrease or increase the frequency of clock_out 214 accordingly. In the FLL embodiment, variable oscillator 201 may correspond to a digitally-controlled oscillator (DCO) and a digital value setting the current frequency may be adjusted based on the value received from comparison circuit. In other embodiments, control circuit 205 may receive the comparison value from comparison circuit 203 and may modify the value to be used in variable oscillator 201 as necessary.

Control circuit 205 may also receive clock_en 210 to enable and disable CGU 200. When clock_en 210 is asserted, control circuit 205 may enable variable oscillator 201 and comparison circuit 203, thereby enabling clock_out 214. When clock_en 210 is de-asserted, then control circuit 205 may disable CGU 200. In response to a de-assertion of clock_en 210, control circuit 205 may also, in some embodiments, store a most recent comparison value and/or other current settings for variable oscillator 201. In other embodiments, variable oscillator 201 and comparison circuit 203 may preserve their last settings when clock_en 210 is de-asserted. Upon a subsequent assertion of clock_en 210, variable oscillator 201 may resume using the most recent settings. By resuming with the most recent settings, variable oscillator 201 may be able to generate clock_out 214 at close to the target frequency, depending on how much frequency drift occurred due to temperature and voltage changes since CGU 200 was last enabled.

Control circuit 205 may include timing unit 207 for measuring amounts of time. Timing unit 207 may be coupled to ref_clock 212 or any other suitable clock signal in SoC 100. When clock_en 210 is de-asserted, control circuit 205 may initialize and start timing unit 207. Timing unit 207 may assert a signal once a predetermined amount of time has elapsed. The predetermined amount of time may be fixed or may be programmable by control circuit 205. An initial value for the predetermined amount of time may be determined during a test procedure. In response to timing unit 207 asserting its signal, control circuit 205 may enable variable oscillator 201 and comparison circuit 203 even if clock_en 210 remains de-asserted. Control circuit 205 may allow variable oscillator 201 and comparison circuit 203 to operate long enough to acquire or maintain lock. Once CGU 200 is locked, then control circuit 205 may disable variable oscillator 201 and comparison circuit 203, and then re-initialize and restart timing unit 207 to measure another predetermined amount of time.

It is noted that the embodiment of oscillator 200 as illustrated in FIG. 2 is merely an example. The illustration of FIG. 2 has been simplified to highlight features relevant to this disclosure. Various embodiments may include different configurations of the functional blocks, including additional blocks. Furthermore, although examples of a PLL and an FLL are presented, the features described may apply to any suitable embodiment of a clock generation unit.

Figure 3:
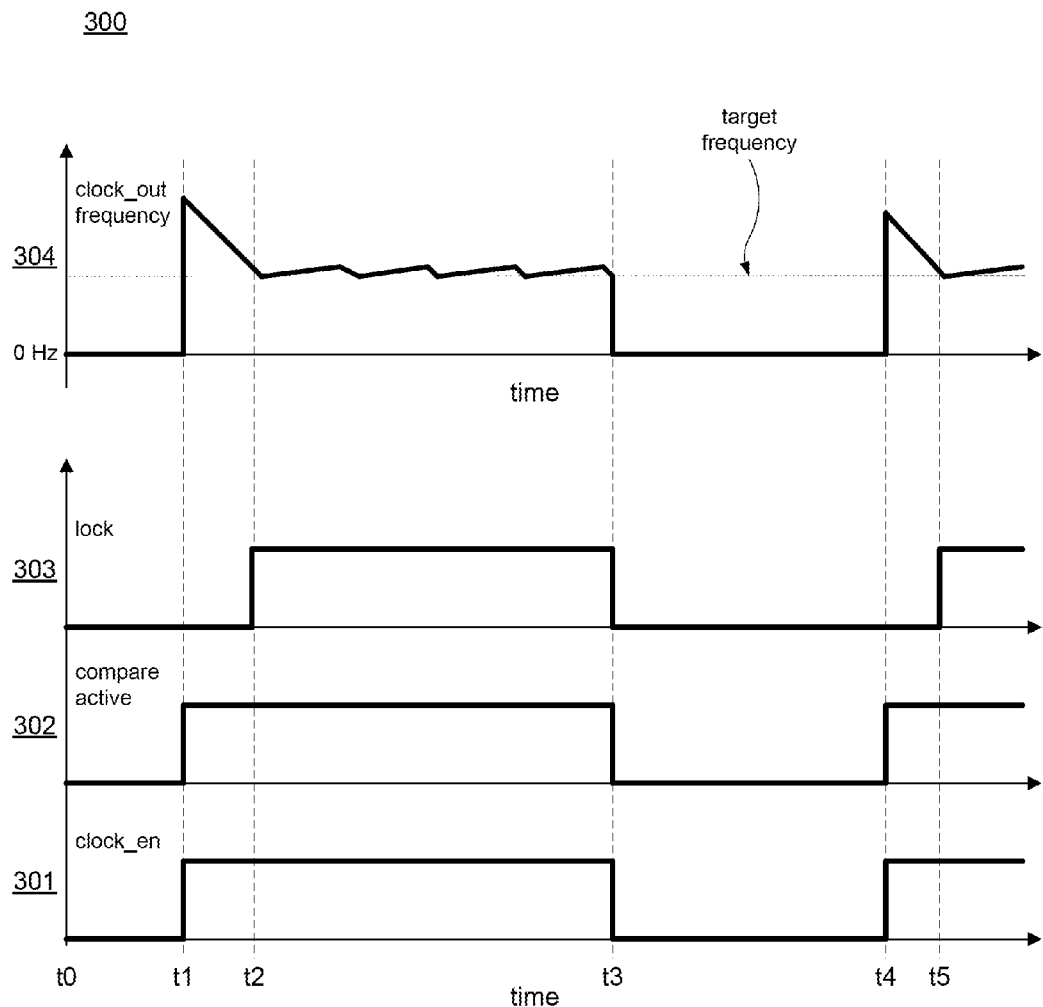
FIG. 3 shows a chart illustrating possible waveforms of a first embodiment of a clock generation unit.

Moving to FIG. 3, a chart illustrating possible waveforms of a first embodiment of a clock generation unit is presented. The waveforms of chart 300 may correspond to operations of a clock generation unit, such as, e.g., CGU 200 in FIG. 2. In this embodiment, the clock generation unit may not recalibrate during periods when CGU 200 is disabled. Waveforms 301, 302, and 303 may illustrate logic levels versus time, while waveform 304 may illustrate a frequency value of a clock output (such as clock_out 214) versus time. Chart 300 includes possible examples of waveforms for clock_en 301, an indication of comparison circuit 203 being active (compare active) 302, an indication of clock_out 214 acquiring lock (lock) 303, and a frequency value of clock_out 214 (clock_out frequency) 304. Referring collectively to CGU 200 of FIG. 2 and chart 300 of FIG. 3, the waveforms may begin at time t0.

At time t0, clock_en 301 is low, which may result in CGU 200 being disabled. In this example, CGU may have not been enabled since being powered on. Comparison active 302 may be low, indicating comparison circuit 203 is inactive. Clock_out frequency 304 may be 0 Hz, indicating variable oscillator 201 is also inactive.

At time t1, clock_en 301 may transition high. A functional block in an SoC, such as, for example, processor 101 in SoC 100 in FIG. 1, may cause the assertion of clock_en 301. Variable oscillator 201 and comparison circuit 203 may each activate in response to the assertion of clock_en 301. Clock_out frequency 304 may start at a frequency higher than the target frequency (indicated by the horizontal dashed line). In other embodiments, clock_out frequency may initialize at a frequency below the target frequency. Compare active 302 may transition high as comparison circuit 203 activates. Lock 303 may remain low as clock_out frequency 304 is not suitably close to the target frequency to acquire a locked state.

At time t2, CGU 200 has been enabled long enough to acquire lock. Lock 303 transitions high to indicate a locked state of CGU 200 as clock_out frequency 304 has reached a frequency sufficiently close to the target frequency. Between time t2 and time t3, clock_out frequency 304 may drift by some amount. The continuous operation of comparison circuit 203 (as indicated by compare active 302), however, may keep clock_out frequency within a predetermined frequency range of the target frequency.

CGU 200 may be disabled at time t3. A functional block in SoC 100, such as processor 101 or power management 104, may cause the de-assertion of clock_en 301. In response, comparison circuit 203 may deactivate as indicated by the low transition of compare active 302 and variable oscillator 201 may deactivate, resulting in clock_out frequency 304 to drop to 0 Hz, thereby causing lock 303 to also transition low.

Between times t3 and t4, a temperature or supply voltage of SoC 100 may change. For example, SoC 100 may have entered a reduced power state and as a result, the temperature of a die SoC 100 is built on may have dropped and/or a voltage level of a voltage regulator may have been reduced. At time t4, SoC 100 may exit the reduced power state and processor 101 may cause clock_en 301 to transition high. CGU 200 may re-activate, including variable oscillator 201. Compare active may transition high, indicating comparison circuit 203 is actively monitoring clock_out frequency 304. Variable oscillator may resume with the same settings as at time t3. Clock_out frequency 304 may be higher than (or lower than in other embodiments) the target frequency despite the same settings due to frequency drift caused by temperature and/or supply voltage changes occurring between times t3 and t4.

At time t5, variable oscillator 201 may have been adjusted by comparison circuit 203 and/or control circuit 205 to a frequency value suitably close to the target frequency. Control circuit 205 may assert lock 303 to indicate CGU 200 has acquired a locked state. Compare active 302 may remain asserted to monitor clock_out frequency 304 and maintain the locked state for as long as clock_en 301 is asserted.

It is noted that chart 300 of FIG. 3 merely illustrates examples of waveforms that may result from an embodiment presented in this disclosure. The waveforms are simplified to provide clear descriptions of the disclosed concepts. In other embodiments, the waveforms may appear different due various influences such as technology choices for building the circuits, actual circuit design and layout, ambient noise in the environment, choice of power supplies, etc. For example, clock_out frequency 304 may change frequencies in a less linear manner than illustrated.

Figure 4:
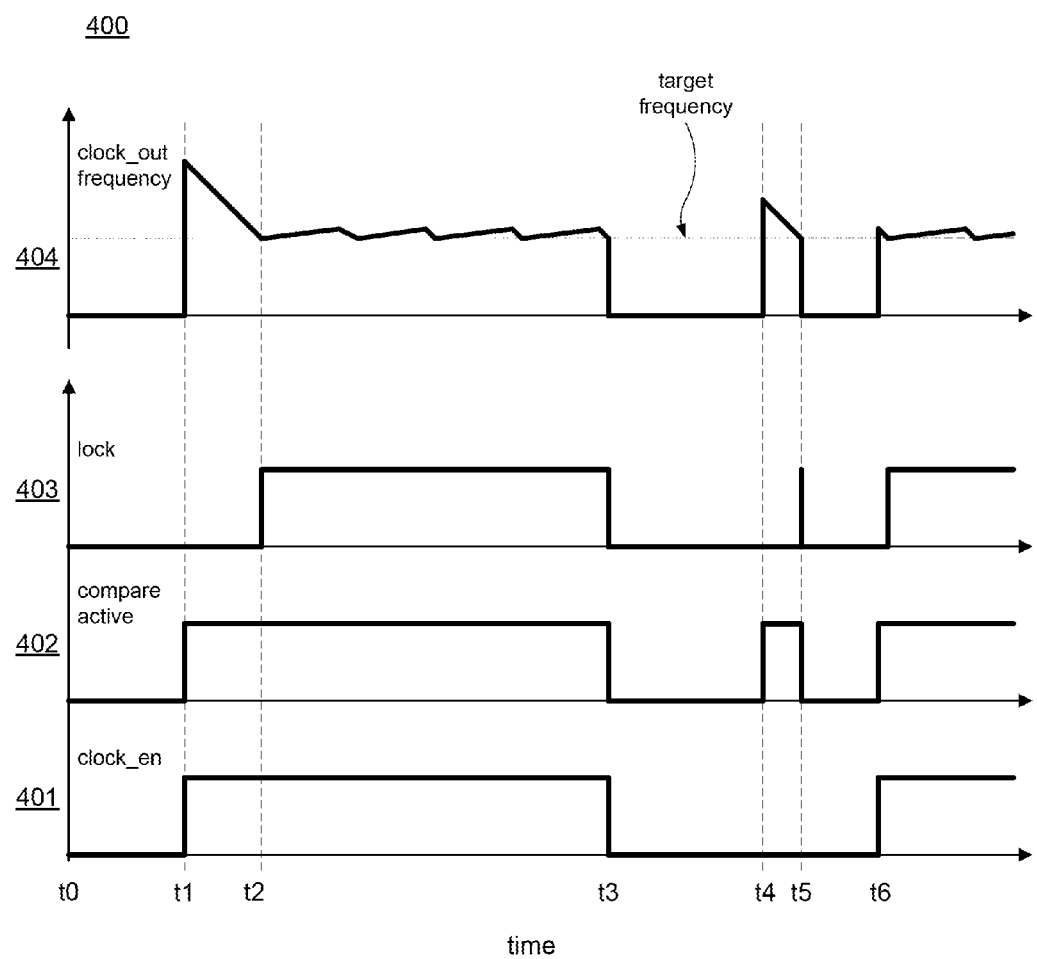
FIG. 4 illustrates a chart of possible waveforms of a second embodiment of a clock generation unit.

Turning now to FIG. 4, a chart of possible waveforms of a second embodiment of a clock generation unit is presented. The waveforms of chart 400 may correspond to operations of a clock generation unit, such as, e.g., CGU 200 in FIG. 2. In this embodiment, the clock generation unit may recalibrate during periods when CGU 200 is disabled. Like chart 300 in FIG. 3, waveforms 401, 402, and 403 may illustrate logic levels versus time, while waveform 404 may illustrate a frequency value of a clock output (such as clock_out 214) versus time. Chart 400 also includes possible examples of waveforms for clock_en 401, compare active 402, lock 403, and clock_out frequency 404. Referring collectively to CGU 200 of FIG. 2 and chart 400 of FIG. 4, the waveforms may begin at time t0.

From time t0 through time t3, chart 400 may be substantially similar to chart 300 in FIG. 3. Descriptions of the similarly referenced waveforms from FIG. 3 may apply to chart 400 during these times. As described in reference to FIG. 3, at time t3, a functional block of an SoC, such as, for example, processor 101 of SoC 100 in FIG. 1, may cause clock_en 401 to de-assert and transition low and variable oscillator 201 and comparison circuit 203 may deactivate. Control circuit 205, however, may initialize and start timing unit 207 to measure a predetermined amount of time.

At time t4, the predetermined amount of time may elapse and timing unit 207 may assert a signal. In response to the asserted signal, control circuit 205 may enable variable oscillator 201 and comparison circuit 203. It is noted that clock_en 401 may remain de-asserted while compare active 402 transitions high at this time. Variable oscillator 201 may resume generating clock_out frequency 404 using settings from time t3 before CGU 200 was deactivated. The elapsed time from t3 to t4 in FIG. 4 may be less than the elapsed time from t3 to t4 in FIG. 3, and, therefore, clock_out frequency at time t4 may be closer to the target frequency than at time t4 in FIG. 3, resulting in a shorter time to re-acquire or reaffirm lock. Control circuit 205 may keep variable oscillator 201 and comparison circuit 203 enabled until lock is acquired at time t5. Once lock 403 asserts at time t5, control circuit 205 may deactivate variable oscillator 201 and comparison circuit 203, and may re-initialize and restart timing unit 207 to measure a next predetermined amount of time again.

At time t6, a functional block, such as processor 101, for example, may cause the re-assertion of clock_en 401 before the next predetermined amount of time elapses. In response, CGU 200 may re-activate with variable oscillator 201 resuming clock generation with clock_out frequency 404 at a frequency much closer to the target frequency. As a result, lock 403 may transition high sooner than it did at time t5 in FIG. 3. In some embodiments, the total time to reacquire lock starting at times t4 and t6 in FIG. 4 may be less than the time to reacquire lock starting at time t4 in FIG. 3.

It is noted that FIG. 4 is merely an example of waveforms that may result from an embodiment disclosed herein. Again, the waveforms are simplified to provide clear descriptions of the disclosed concepts. In other embodiments, the waveforms may appear different due various influences such as technology choices for building the circuits, actual circuit design and layout, ambient noise in the environment, choice of power supplies, etc.

Figure 5:
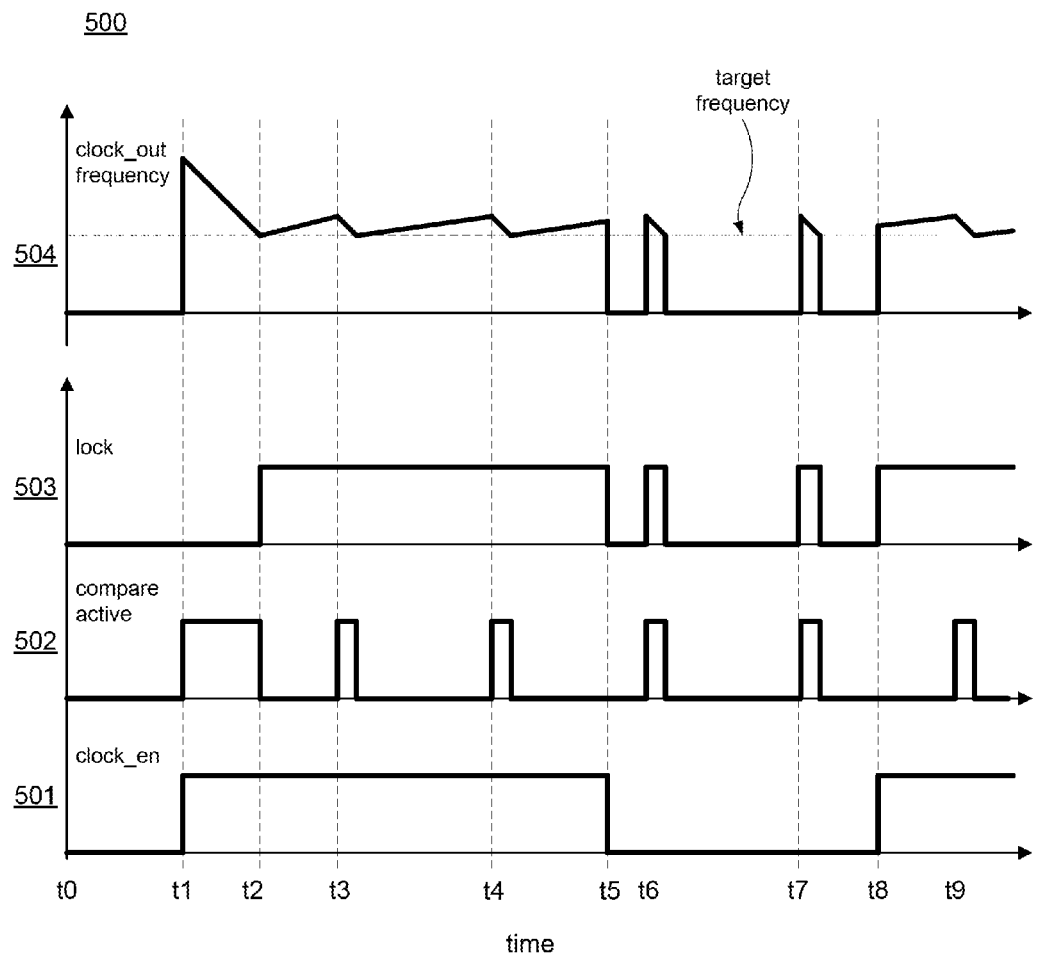
FIG. 5 shows a chart illustrating possible waveforms of a third embodiment of a clock generation unit.

Moving now to FIG. 5, a diagram of a third embodiment of a clock generation unit is illustrated. The waveforms of chart 500 may correspond to operations of a clock generation unit, such as, e.g., CGU 200 in FIG. 2. In this embodiment, the clock generation unit may disable comparison circuit 203 while CGU 200 is active to conserve power. Like chart 300 and chart 400 in FIGS. 3 and 4, respectively, waveforms 501, 502, and 503 may illustrate logic levels versus time, while waveform 504 may illustrate a frequency value of a clock output (such as clock_out 214) versus time. Chart 500 also includes possible examples of waveforms for clock_en 501, compare active 502, lock 503, and clock_out frequency 504. Referring collectively to CGU 200 of FIG. 2 and chart 500 of FIG. 5, the waveforms may begin at time t0.

From time t0 up to time t2, chart 500 may be substantially similar to chart 300 in FIG. 3. Descriptions of the similarly referenced waveforms from FIG. 3 may apply to chart 500 during these times. At time t2, when CGU 200 acquires lock, control circuit 205 may deactivate comparison circuit 203, as indicated by compare active 502. Control circuit 205 may initiate and start timing unit 207 to measure a second predetermined amount of time. This predetermined amount of time may be different than the predetermined amount of time described in regards to FIG. 4. In other embodiments, the two predetermined amounts of time may be equal.

The second predetermined amount of time may elapse at time t3. Control circuit 205 may re-enable comparison circuit 203 and keep comparison circuit 203 enabled until clock_out frequency 504 is within a threshold range of the target frequency. In the current embodiment, control circuit 205 may utilize two threshold frequency ranges. A first range may be used to determine if clock_out frequency 504 is close enough to the target frequency to be considered locked. A second frequency range may be used to determine when clock_out frequency 504 is close enough to the target frequency to stop an active comparison period and disable comparison circuit 203 to conserve power. The second threshold may have a more narrow range to get clock_out frequency 504 close enough to the target frequency that the frequency will not drift outside of the first range before the second predetermined amount of time elapses and another comparison period begins, such as at time t4. During the comparison cycle of time t4, clock control 205 may configure timing unit 207 to measure another second predetermined amount of time.

At time t5, a functional unit, such as processor 101 or clock management 106 of SoC 100 in FIG. 1, may cause clock_en 501 to de-assert and transition low. In response to the de-assertion, variable oscillator 201 may be disabled and clock_out frequency 504 may be reduced to zero Hz. Timing unit 207 in control circuit 205 may, however, continue to measure the second predetermined amount of time started during the last comparison period and at time t6, the second predetermined amount of time may elapse. Timing unit 207 may assert a signal and in response, control circuit 205 may enable variable oscillator 201 and comparison circuit 203, similar to as described in regards to time t4 in FIG. 4. One difference, as compared to FIG. 4, is that variable oscillator 201 may resume in a locked state due to control circuit 205 re-enabling variable oscillator 201 and comparison circuit 203 within the second predetermined period of time. Control circuit 205 may disable variable oscillator 201 and comparison circuit 203 once clock_out frequency 504 is within the second threshold range. Timing unit 207 may be reset and restarted and the process may repeat at time t7.

A function block in SoC 100, such as clock management unit 106 or power management unit 104, may cause clock_en 501 to assert at time t8. Control circuit 205 may enable variable oscillator 201 and comparison circuit 203. Clock_out frequency 504 may resume in a locked state due to the comparison periods at times t6 and t7. Timing unit 207 may continue measuring the second predetermined amount of time started after time t7, and therefore, compare active may remain low until the second predetermined amount of time has elapsed at time t9, at which point, another comparison period occurs.

By continually re-enabling variable oscillator 201 and comparison circuit 203 after a second predetermined amount of time elapses, CGU 200 may be capable of outputting clock_out frequency 504 at close to the target frequency. In some embodiments, clock_out frequency 504 may not always resume in a locked state, but may resume close enough that reacquiring lock occurs quickly.

It is noted that FIG. 5 is merely another example of waveforms that may result from an embodiment disclosed herein. Again, the waveforms are simplified to provide clear descriptions of the disclosed concepts. The waveforms may appear different in other embodiments, due to various influences such as technology choices, circuit design and layout, ambient noise in the environment, choice of power supplies, etc. In addition, it is noted that although signals such as clock_en 501 and lock 503 are illustrated and described as being active high signals, it is known and contemplated that active low signals may be implemented instead.

Method for Operating a Clock Generation Unit

Figure 6:
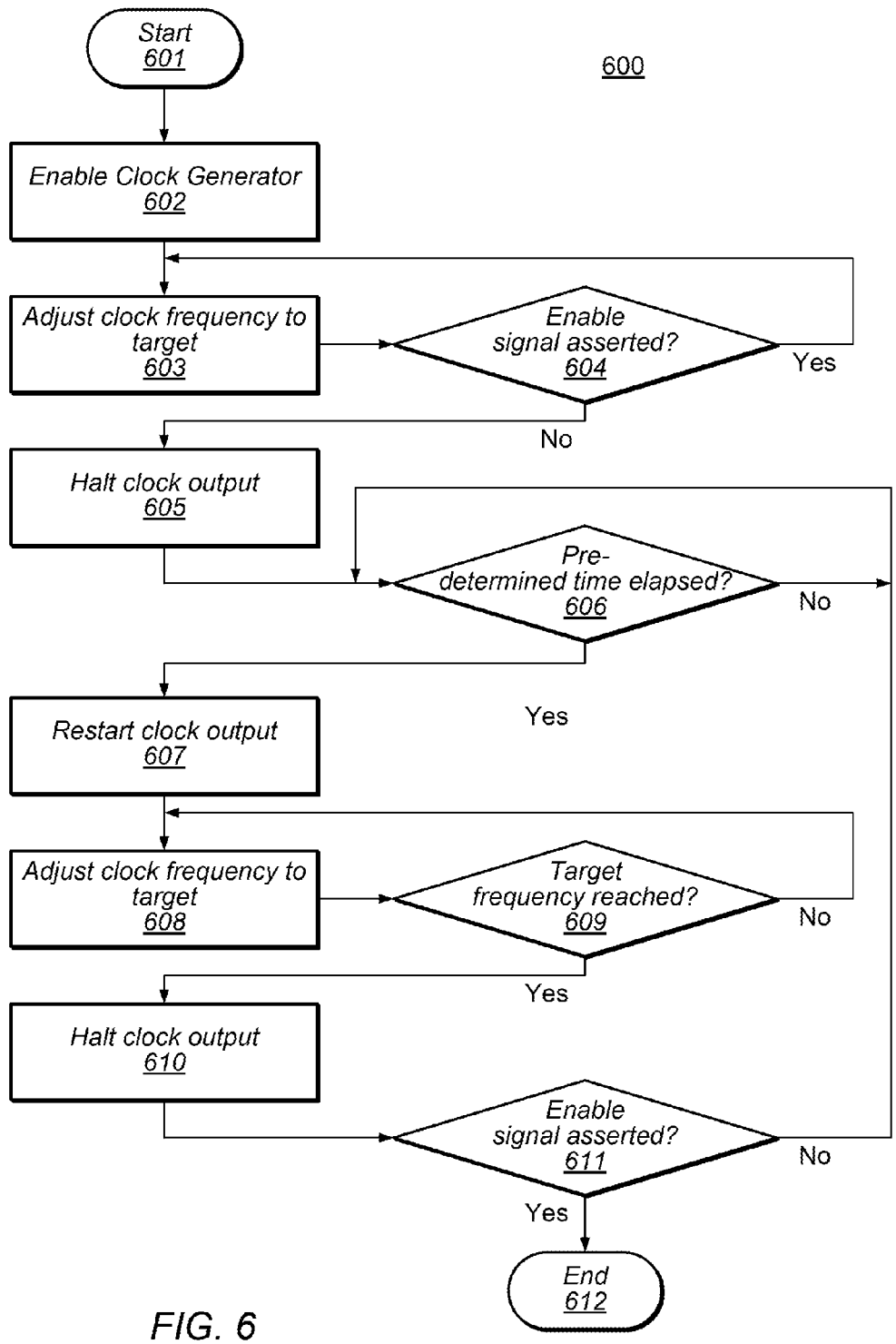
FIG. 6 shows a flowchart illustrating an embodiment of a method for adjusting a frequency of a clock signal.

Turning to FIG. 6, a flowchart of an embodiment of a method for adjusting a frequency of a clock signal is illustrated. The method may be applied to a clock generation unit, such as, for example, CGU 200 in FIG. 2, in a system such as SoC 100 in FIG. 1. Referring collectively to SoC 100, CGU 200, and the flowchart in FIG. 6, the method may begin in block 601.

A functional block in SoC 100 may assert clock_en 210 in CGU 200 (block 602). The functional block, such as, for example, I/O block 103, may require clock_out 214 to perform a task, such as send a message via a serial communications interface. In response to the assertion of clock_en 210, control circuit 205 may enable other portions of CGU 200, such as comparison circuit 203 and variable oscillator 201 which may begin generating clock_out 214 at an initial frequency.

CGU 200 may adjust the frequency of clock_out 214 towards a target frequency (block 603). The target frequency may be a single frequency fixed by the design of CGU 200, or may be a programmable frequency selected by a functional block in SoC 100, such as processor 101. Comparison circuit 203 may compare the frequency of clock_out 214 to a frequency of ref_clock 212 and send a value representing the difference between the actual frequency of clock_out 214 and the target frequency to control circuit 205. Control circuit 205 may use the received value to send an adjustment factor to variable oscillator 201 to adjust the frequency of clock_out 214 closer to the target frequency.

The method may depend on a state of clock_en 210 (block 604). If clock_en 210 remains enabled, then I/O block 103 may still require clock_out 214 to complete the task. The method may return to block 603 to further adjust the frequency of clock_out 214 towards the target frequency. If, however, I/O block 103 has completed its task, then I/O block 103 may de-assert clock_en 210. If another block is currently using clock_out 214, such as processor 101, for example, then that block may keep clock_en 210 asserted and the method again returns to block 603. Otherwise, if no functional block is asserting clock_en 210, the method may move to block 605 to halt clock_out 214.

In response to a de-assertion of clock_en 210, control circuit 205 may disable comparison circuit 203 and variable oscillator 201, causing clock_out 214 to cease oscillating (block 605). Clock_out 214 may remain at a high or low logic level, depending on the design of CGU 200. Control circuit 205 may also include timing unit 207, and may set timing unit 207 to measure a predetermined amount of time.

The method may now depend on an elapsed time since timing unit 207 was set (block 606). If the elapsed time since control circuit 205 set timing unit 207 is less than the predetermined amount of time, then the method may remain in block 606. Timing unit 207 may increment (or, in some embodiments, decrement) a count value dependent on an available clock source, such as ref_clock 212, for example. When the count value reaches a value corresponding to the predetermined amount of time, then timing unit 207 may indicate to control circuit 205 that the predetermined amount of time has elapsed. If timing unit 207 reaches the predetermined time, then the method may move to block 607 to restart clock_out 214.

Variable oscillator 201 may be activated and clock_out 214 may restart (block 607). Control circuit 205 may activate variable oscillator 201 with control values set as they were at the time variable oscillator 201 was disabled. Despite using the most recent settings, when clock_out 214 resumes oscillating, the frequency may have drifted due to supply voltage or temperature changes occurring during the predetermined amount of time. The predetermined amount of time, however, may be selected such that the frequency drift may be limited.

CGU 200 may adjust the frequency of clock_out 214 towards the target frequency (block 608). Control circuit 205 may also activate comparison circuit 203 in response to timing unit 207 indicating the predetermined amount of time has elapsed. Comparison circuit 203 and control circuit 205 may resume monitoring of the frequency of clock_out 214 and provide adjustment factors to variable oscillator 201 to adjust the frequency closer to the target frequency.

The method may depend on the frequency of clock_out 214 (block 609). Control circuit 205 may determine if the frequency of clock_out 214 is within a predetermined range of the target frequency. The predetermined range may correspond to a frequency range used to determine if clock_out 214 is locked. In other embodiments, the predetermined range may be tighter (i.e., closer) to the target frequency or looser (i.e., farther) from the target frequency, depending on the design of CGU 200. If control circuit 205 determines the frequency of clock_out 214 is outside of the predetermined range, i.e., too far off target, then the method may move back to block 608 for further adjustments to clock_out 214. Otherwise, the method may move to block 610 to halt the clock_out 214.

Upon reaching the predetermined range of frequencies, control circuit 205 may deactivate variable oscillator 201 and thereby halt clock_out 214 (block 610). Control circuit 205 may also deactivate comparison circuit 203. Deactivating these components of CGU 200 may help to reduce power consumption in SoC 100 as well as to reduce unnecessary switching noise. In some embodiments, when deactivating variable oscillator 201 and comparison circuit 203, control circuit 205 may also reset and restart timing unit 207 to measure another predetermined amount of time. In other embodiments, timing unit 207 may reset and continue counting automatically upon the count value reaching the value corresponding to the predetermined amount of time, and continue to repeat the count until control unit 205 disables timing unit 207.

The method may depend on a state of clock_en 210 (block 611). If clock_en 210 remains disabled, then the method may return to block 606 to determine if the predetermined amount of time has elapsed. If, however, a functional block needs clock_out 214, such as processor 101, for example, then that block may assert clock_en 210 and the method may end in block 612.

It is noted that the method illustrated in FIG. 6 is merely an example embodiment. Variations on this method are possible. Some operations may be performed in a different sequence, and/or additional operations may be included.

Figure 7:
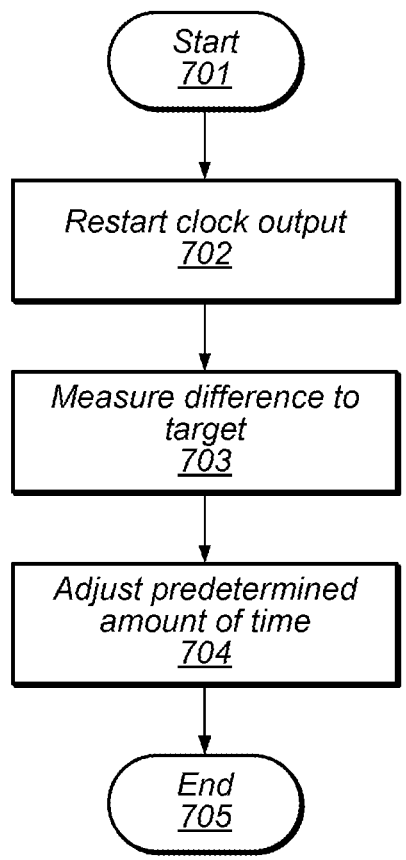
FIG. 7 illustrates a flowchart of an embodiment of a method for adjusting a predetermined amount of time between adjusting a clock signal.

Moving to FIG. 7, a flowchart of an embodiment of a method for adjusting a predetermined amount of time between adjusting a clock signal is illustrated. The method may be applied to a clock generation unit, such as, for example, CGU 200 in FIG. 2, in a system such as SoC 100 in FIG. 1. The operations described in flowchart 700 may correspond to additional tasks performed in block 607 or block 608 as described in FIG. 6. Referring collectively to SoC 100, CGU 200, and the flowchart in FIG. 7, the method may begin in block 701, with CGU 200 previously disabled in response to a de-assertion of clock_en 210 by a functional unit in SoC 100.

Control circuit 205 may restart clock_out 214 (block 702). Control circuit 205 may activate variable oscillator 201 in response to an indication from timing unit 207 that a predetermined amount of time has elapsed. Variable oscillator 201 may resume generation of clock_out 214 using settings from the last time variable oscillator 201 was active. These settings may result in clock_out 214 resuming at a frequency that has drifted some number of hertz away from the target frequency.

Control circuit 205 may activate comparison circuit 203 to measure a difference between the actual frequency of clock_out 214 and the target frequency (block 703). Comparison circuit 203 may use ref_clock 212 to determine how far away the actual frequency of clock_out 214 is from the target frequency. Compare circuit 203 may send a value representing the difference to control circuit 205. In some embodiments, the value may correspond to a binary number indicated by logic highs and logic lows. In another embodiment, the value may correspond to an analog voltage level in which a positive voltage indicates the actual frequency is lower than the target frequency and a negative voltage indicates the actually frequency is higher than the target (or vice versa in other embodiments). In other embodiments, the value may correspond to a logic signal with a varying pulse width, a shorter pulse width may indicate the actual frequency is too fast and a longer pulse width may indicate the actual frequency is too slow (or vice versa).

Control circuit 205 may adjust the predetermined amount of time (block 704). Control circuit 205 may use the received value representing the difference in frequency from the target frequency to determine an adjustment for the predetermined amount of time described above in regards to blocks 605 and 606 of FIG. 6. For example, in one embodiment, control circuit 205 may decrease the predetermined amount of time if the received value indicates the actual frequency is more than a first threshold value away from the target frequency, i.e., a frequency delta between the actual and target frequencies is too large. By reducing the predetermined amount of time, control circuit 205 can activate a comparison period more often, allowing less time for the actual frequency to drift away from the target frequency and reducing the delta for subsequent comparison periods. Conversely, if the frequency delta is less than a second threshold value (in which the second threshold value is equal to or less than the first threshold value) then control circuit 205 may increase the predetermined amount of time, allowing the components of CGU 200 to remain in lower power states for a longer amount of time.

In another embodiment, instead of comparing a most recently received value from comparison circuit 203 to one or more threshold values, control circuit 205 may track one or more previous received values. Depending on the most recent received value and one or more previously received values, control circuit 205 may determine if the predetermined amount of time requires adjusting. For example, if the most recent received value corresponds to a higher frequency delta than the value received previously, then the predetermined amount of time may be reduced. Conversely, if the most recently received value corresponds to a lower frequency delta than the previously received value, then the predetermined amount of time may be increased. In some cases, control circuit 205 may determine to leave the predetermined amount of time at its current value. Once an adjustment to the predetermined amount of time has been determined and implemented, the method may end in block 705.

It is noted that the method illustrated in FIG. 7 is merely an example embodiment. Variations on this method are contemplated. Some operations may be performed in a different sequence, and/or additional operations may be included.

Numerous variations and modifications will become apparent to those skilled in the art once the above disclosure is fully appreciated. It is intended that the following claims be interpreted to embrace all such variations and modifications.

What is claimed is:

1. A system, comprising:
a functional unit; and
a clock generation unit configured to:
adjust a frequency of an output clock signal to a target frequency responsive to an assertion of an enable signal by the functional unit;
halt the output clock signal responsive to a de-assertion of the enable signal by the functional unit;
restart the output clock signal responsive to a determination that a first predetermined amount of time has elapsed since the output clock signal was halted;
adjust the frequency of the output clock signal responsive to restarting the output clock signal; and
halt the output clock signal responsive to a determination that the frequency of the output clock signal is within a predetermined frequency range that includes the target frequency.

2. The system of claim 1, wherein to adjust the frequency of the output clock signal, the clock generation unit is further configured to determine a difference between the frequency of the output clock signal and the target frequency.

3. The system of claim 2, wherein the clock generation unit is further configured to adjust the first predetermined amount of time dependent upon a most recent value of the difference between the frequency of the output clock signal and the target frequency.

4. The system of claim 2, wherein the clock generation unit is further configured to determine the difference between the frequency of the output clock signal and the target frequency in a second predetermined amount of time.

5. The system of claim 4, wherein the clock generation unit is further configured to adjust the second predetermined amount of time dependent upon a most recent value of the difference between the frequency of the output clock signal and the target frequency.

6. The system of claim 1, wherein the functional unit is further configured to de-assert the enable signal responsive to entering an inactive mode and wherein the clock generation unit is further configured to restart the output clock signal while the functional unit is in the inactive mode.

7. The system of claim 1, wherein the first predetermined amount of time is initially determined during a test procedure.

8. A method, comprising:
   adjusting a frequency of an output clock signal to a target frequency responsive to a functional unit asserting an enable signal;
   halting the output clock signal responsive to the functional unit de-asserting the enable signal;
   restarting the output clock signal responsive to a determination that a first predetermined period of time has elapsed since the output clock signal was halted;
   adjusting the frequency of the output clock signal responsive to restarting the output clock signal; and
   halting the output clock signal responsive to a determination that the frequency of the output clock signal is within a predetermined frequency range that includes the target frequency.

9. The method of claim 8, wherein adjusting the frequency of the output clock signal comprises determining a difference between the frequency of the output clock signal and the target frequency.

10. The method of claim 9, further comprising adjusting the first predetermined amount of time dependent upon a most recent value of the difference between the frequency of the output clock signal and the target frequency.

11. The method of claim 9, further comprising determining the difference between the frequency of the output clock signal and the target frequency in a second predetermined amount of time.

12. The method of claim 11, further comprising adjusting the second predetermined amount of time dependent upon a most recent value of the difference between the frequency of the output clock signal and the target frequency.

13. The method of claim 8, further comprising:
   de-asserting the enable signal responsive to the functional unit entering an inactive mode; and
   restarting the output clock signal while the functional unit is in the inactive mode.

14. The method of claim 8, further comprising determining the first predetermined amount of time during a test procedure.

15. An apparatus, comprising:
   a clock generation circuit configured to adjust a frequency of an output clock signal to a target frequency responsive to an assertion of an enable signal; and
   control circuitry configured to:
      halt the output clock signal responsive to a de-assertion of the enable signal; and
      restart the output clock signal responsive to a determination that a first predetermined amount of time has elapsed since the output clock signal was halted;
   wherein the clock generation circuit is further configured to adjust the frequency of the output clock signal responsive to restarting the output clock signal; and
   wherein the control circuitry is further configured to halt the output clock signal responsive to a determination that the frequency of the output clock signal is within a predetermined frequency range that includes the target frequency.

16. The apparatus of claim 15, wherein to adjust the frequency of the output clock signal, the clock generation circuit is further configured to determine a difference between the frequency of the output clock signal and the target frequency.

17. The apparatus of claim 16, wherein the control circuitry is further configured to adjust the first predetermined amount of time dependent upon a most recent value of the difference between the frequency of the output clock signal and the target frequency.

18. The apparatus of claim 16, wherein the clock generation circuit is further configured to determine the difference between the frequency of the output clock signal and the target frequency in a second predetermined amount of time.

19. The apparatus of claim 18, wherein the control circuitry is further configured to adjust the second predetermined amount of time dependent upon a most recent value of the difference between the frequency of the output clock signal and the target frequency.

20. The apparatus of claim 15, wherein the first predetermined amount of time is initially determined during a factory test procedure.

* * * * *